(12) United States Patent
Golsch et al.

(10) Patent No.: US 10,716,068 B2
(45) Date of Patent: Jul. 14, 2020

(54) POWER SAVING METHODS FOR COMMUNICATION IN LOCALIZATION SYSTEMS

(71) Applicants: DENSO International America, Inc., Southfield, MI (US); DENSO CORPORATION, Kariya, Aichi-pref. (JP)

(72) Inventors: Kyle Golsch, Pontiac, MI (US); Steven Sute, Dearborn, MI (US); Peter Atencio, Southfield, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/153,896

(22) Filed: Oct. 8, 2018

(65) Prior Publication Data

US 2019/0116556 A1 Apr. 18, 2019

Related U.S. Application Data

(60) Provisional application No. 62/572,039, filed on Oct. 13, 2017.

(51) Int. Cl.
*H04W 4/00* (2018.01)
*H04W 52/02* (2009.01)
(Continued)

(52) U.S. Cl.
CPC ......... *H04W 52/0245* (2013.01); *B60R 25/24* (2013.01); *G07C 9/00174* (2013.01);
(Continued)

(58) Field of Classification Search
USPC ................. 370/311, 338; 340/901–905, 340/425.5–426.26
See application file for complete search history.

(56) References Cited

U.S. PATENT DOCUMENTS 5,592,173 A * 1/1997 Lau .................. G01S 19/34
342/357.74
9,666,005 B2 5/2017 Ellis et al.
(Continued)

FOREIGN PATENT DOCUMENTS

BR 102014017465 A2 2/2016
CN 104574593 A 4/2015
(Continued)

*Primary Examiner* — Thai D Hoang
(74) *Attorney, Agent, or Firm* — Harness, Dickey & Pierce, P.L.C.

(57) ABSTRACT

Systems and methods are provided and include a control module that establishes a secure wireless communication connection with a portable device. A sensor receives connection information about the secure wireless communication connection, eavesdrops on the wireless secure communication connection based on the connection information, measures signal information of a communication signal sent from the portable device to the control module during the secure wireless communication connection, compares the measured signal information with wakeup criteria information, and reports the measured signal information to the control module in response to the measured signal information satisfying the wakeup criteria. The control module receives the measured signal information from the sensor and determines a location of the portable device based on the measured signal information. The measured signal information includes at least one of received signal strength indicator information, angle of arrival information, and time difference of arrival information.

20 Claims, 9 Drawing Sheets

| Portable Device (20) Location | Software State | Main Processing Module (34) | Wireless Comm. Module (32) | Exterior Sensors (10A to 10E) | Interior Sensors (10F to 10K) |
|---|---|---|---|---|---|
| Out of Range (A) | Waiting for Connection | Sleep | Scan | Sleep | Sleep |
| Connection Range (B) | Standby State | Wakeup->Sleep | Low Power | Sleep | Sleep |
| Start Localization Range (C) | Outside Localization State | Wakeup | Wakeup | Intermittent Sleep | Sleep |
| Welcome Mode Range (D) (Welcome Light On) | Full Localization State | Wakeup | Wakeup | Wakeup | Wakeup |
| Authentication Range (E) (Allow Unlock/Lock) | | | | | |

(51) Int. Cl.
  *G07C 9/00* (2020.01)
  *H04W 4/40* (2018.01)
  *H04B 17/318* (2015.01)
  *H04W 4/80* (2018.01)
  *B60R 25/24* (2013.01)
  *H04W 12/06* (2009.01)
  *G01S 5/02* (2010.01)

(52) U.S. Cl.
  CPC ....... *G07C 9/00309* (2013.01); *H04B 17/318* (2015.01); *H04W 4/40* (2018.02); *H04W 4/80* (2018.02); *H04W 12/06* (2013.01); *H04W 52/0261* (2013.01); *B60R 2325/101* (2013.01); *G01S 5/02* (2013.01); *G07C 2009/00373* (2013.01); *G07C 2009/00507* (2013.01); *G07C 2009/00793* (2013.01); *G07C 2009/00984* (2013.01); *G07C 2209/63* (2013.01)

(56) References Cited

U.S. PATENT DOCUMENTS

| | | |
|---|---|---|
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |
| 10,018,685 B2* | 7/2018 | Kauter ............... G01R 33/0023 |
| 2007/0170882 A1* | 7/2007 | Pellarin ................ G01D 18/008 |
| | | 318/466 |
| 2008/0065290 A1* | 3/2008 | Breed ...................... G01L 17/00 |
| | | 701/31.4 |
| 2008/0216567 A1* | 9/2008 | Breed ...................... B60C 11/24 |
| | | 73/146.5 |
| 2011/0215921 A1 | 9/2011 | Ben Ayed et al. |
| 2012/0045058 A1 | 2/2012 | Weghaus |
| 2014/0188348 A1 | 7/2014 | Gautama et al. |
| 2014/0274013 A1 | 9/2014 | Santavicca |
| 2015/0148989 A1 | 5/2015 | Cooper et al. |
| 2015/0161832 A1 | 6/2015 | Esselink et al. |
| 2015/0195780 A1* | 7/2015 | Liu ................... H04W 52/0216 |
| | | 370/311 |
| 2015/0310681 A1 | 10/2015 | Avery et al. |
| 2015/0356797 A1 | 12/2015 | McBride et al. |
| 2016/0150407 A1 | 5/2016 | Michaud et al. |
| 2017/0062938 A1 | 3/2017 | Cheng et al. |
| 2017/0080899 A1 | 3/2017 | Watanabe et al. |
| 2017/0104589 A1 | 4/2017 | Lambert et al. |
| 2017/0120868 A1* | 5/2017 | Watanabe ............... G01S 13/74 |
| 2017/0132533 A1 | 5/2017 | Darnell et al. |
| 2017/0180929 A1* | 6/2017 | Cavendish ............ H04W 4/021 |
| 2017/0180963 A1* | 6/2017 | Cavendish ............ H04W 4/025 |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0246559 A1* | 8/2018 | Namgoong ........... G06F 1/3206 |
| 2018/0269565 A1 | 9/2018 | Guthrie et al. |

FOREIGN PATENT DOCUMENTS

| | | | |
|---|---|---|---|
| FR | 3023314 A1 | 1/2016 | |
| WO | WO-16156682 A1 | 10/2016 | |
| WO | WO-18040641 A1 | 3/2018 | |
| WO | WO-2019119922 A1 * | 6/2019 | ........ H04W 52/0219 |

* cited by examiner

POWER SAVING METHODS FOR COMMUNICATION IN LOCALIZATION SYSTEMS

CROSS-REFERENCE TO RELATED APPLICATIONS

This application claims the benefit of U.S. Provisional Application No. 62/572,039, filed on Oct. 13, 2017. The entire disclosure of the above application is incorporated herein by reference.

FIELD

The present disclosure relates to power saving methods for communication in localization systems.

BACKGROUND

This section provides background information related to the present disclosure which is not necessarily prior art.

Passive entry/passive start (PEPS) systems allow a vehicle to locate a key associated with the vehicle, such as a wireless key fob carried by a user of the vehicle. Traditionally, PEPS systems allow anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the key fob. If the key fob can be authenticated and is located within an authorizing zone, the vehicle's function is made available to the user, i.e. the vehicle doors are unlocked and/or the vehicle is started.

Traditional PEPS systems, however, can consume a large amount of power and can drain a vehicle battery while scanning for and communicating with the key fob to perform localization and authentication of the key fob.

SUMMARY

This section provides a general summary of the disclosure, and is not a comprehensive disclosure of its full scope or all of its features.

A system is provided and includes a control module configured to establish a secure wireless communication connection with a portable device. The system also includes at least one sensor configured to receive connection information about the secure wireless communication connection, to eavesdrop on the wireless secure communication connection based on the connection information, to measure signal information of at least one communication signal sent from the portable device to the control module during the secure wireless communication connection, to compare the measured signal information with wakeup criteria information, and to report the measured signal information to the control module in response to the measured signal information satisfying the wakeup criteria. The control module is further configured to receive the measured signal information from the at least one sensor and to determine a location of the portable device based on the measured signal information, the measured signal information including at least one of received signal strength indicator information, angle of arrival information, and time difference of arrival information for the at least one communication signal sent from the portable device to the control module.

A method is also provided and includes establishing, with a control module, a secure wireless communication connection with a portable device. The method also includes sending, with the control module, connection information about the secure wireless communication connection. The method also includes eavesdropping, with the at least one sensor, on the wireless secure communication connection based on the connection information. The method also includes measuring, with the at least one sensor, signal information of at least one communication signal sent from the portable device to the control module during the secure wireless communication connection. The method also includes comparing, with the at least one sensor, the measured signal information with wakeup criteria information. The method also includes reporting, with the at least one sensor, the measured signal information to the control module in response to the measured signal information satisfying the wakeup criteria. The method also includes receiving, with the control module, the measured signal information from the at least one sensor. The method also includes determining, with the control module, a location of the portable device based on the measured signal information, the measured signal information including at least one of received signal strength indicator information, angle of arrival information, and time difference of arrival information for the at least one communication signal sent from the portable device to the control module.

Another system is provided and includes a control module configured to establish a secure wireless communication connection with a portable device, the secure wireless communication connection including communication during a plurality of communication connection events separated in time. The system also includes at least one sensor configured to receive connection information about the secure wireless communication connection, to receive a reporting command indicating a number of communication connection events, to eavesdrop on at least one communication connection event according to the number of communication connection events indicated by the reporting command based on the connection information, to measure signal information of at least one communication signal sent from the portable device to the control module during the at least one communication connection event, and to report the measured signal information to the control module after eavesdropping on the at least one communication connection event. The control module is further configured to receive the measured signal information from the at least one sensor and to determine a location of the portable device based on the measured signal information, the measured signal information including at least one of received signal strength indicator information, angle of arrival information, and time difference of arrival information for the at least one communication signal sent from the portable device to the control module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
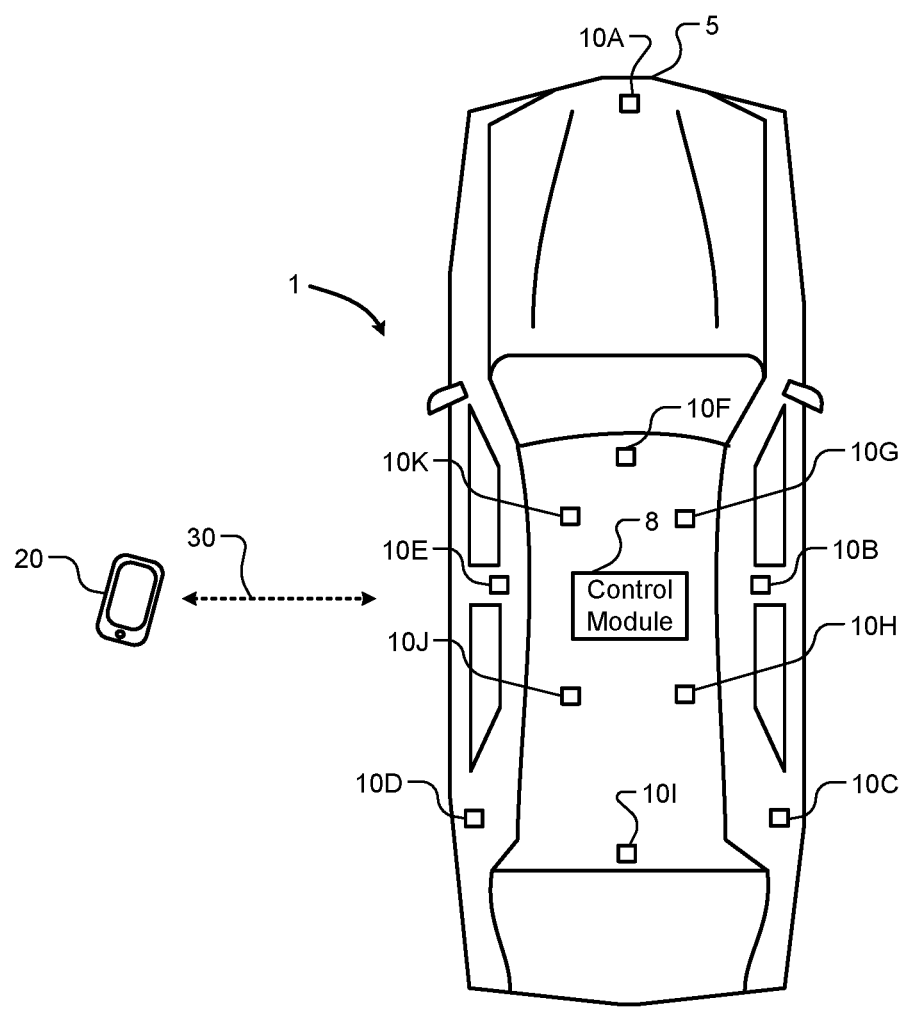
FIG. 1 illustrates a subject vehicle with a localization system according to the present disclosure.

Example embodiments will now be described more fully with reference to the accompanying drawings.

The present disclosure relates to power saving methods for communication in localization systems, such as a PEPS system utilizing a consumer grade wireless protocol that provides for establishing a secure communication connection between a portable device and the PEPS system of the vehicle, including sensors of the vehicle. The portable device, for example, can be a key fob, a smartphone, a tablet, a wearable computing device (such as a smartwatch, a bracelet, a necklace, a ring, etc.), or any other suitable computing device configured for communication with a PEPS system using a communication protocol with secure communication connections.

Communicating devices can communicate using a secure connection by using particular communication information that is known by the communicating devices, such as information regarding the timing, communication channels or frequencies, encryption, decoding, etc., of communication packets sent between the communicating devices. In this way, it is more difficult for a third-party to eavesdrop or intercept packets sent over the secure communication connection between the communication devices. For example, communication protocols that utilize secure communication connections can use frequency hopping spread spectrum (FHSS) communication, direct-sequence spread spectrum (DSSS) communication, or orthogonal frequency-division multiplexing (OFDM) communication during communication over the secure communication connection. For example, the Bluetooth Low Energy (BLE) communication protocol uses FHSS communication during communication over the secure communication connection. For further example, the Wi-Fi and Wi-Fi direct communication protocols use DSSS and/or OFDM communication during communication over the secure communication connection. Additionally or alternatively, the communication devices can use encryption for communication packets sent over the secure communication connection. For example, communication over secure communication channels make it difficult for unauthorized devices to know the channel, timing, and/or decoding information to receive the next communication packet(s) between the two devices. For example, communication over secure communication channels makes it difficult for unauthorized devices to know the channel, timing, and/or decoding information to receive the next communication packet(s) between the two devices. These features make it difficult for unauthorized devices to spy on the communication between a portable device and a PEPS system of the vehicle using secure communication channels.

As discussed in further detail below, a localization may include a central communication module, also referred to as a control module, and a sensor network. The control module can establish a secure communication connection with a portable device. For example, the control module can establish a secure communication connection using the BLE communication protocol. The control module can then communicate information about the secure communication connection, such as timing and synchronization information, to each of the sensors in the sensor network. For example, the control module can communicate information about the secure communication connection, such as the timing of the next communication connection event, the timing interval between communication connection events, the communication channel for the next communication connection event, a channel map, a channel hop interval or offset to calculate the channel for subsequent communication connection events, communication latency information, communication jitter information, etc. The sensors can then eavesdrop on communication packets sent by the portable device to the control module and can measure signal information of the signals received from the portable device. For example, the sensors can measure the received signal strength and determine a received signal strength indicator (RSSI) value. Additionally or alternatively, the sensors can determine other measurements of the signals received from the portable device, such as an angle of arrival, a time of arrival, a time difference of arrival, etc.

The sensors can then communicate the measured information to the control module, which can then determine a location of the portable device or a distance to the portable device based on the measured information received from each of the sensors. For example, the control module can determine the location of the portable device based on, for example, the patterns of the RSSI values for the various signals received from the portable device by the various sensors. For example, a relatively strong RSSI generally indicates that the portable device is closer and a relatively weak RSSI generally indicates that the portable device is farther away. By analyzing the RSSI for communication signals sent by the portable device with each of the sensors, the control module can determine a location of or distance to the portable device relative to the vehicle. Additionally or alternatively, angle of arrival or time difference of arrival measurements for the signals sent by the portable device and received by the sensors can also be used by the control module to determine the location of the portable device. Additionally or alternatively, the sensors themselves can determine a location of the portable device or distance to the portable device based on the measured information and can communicate the location or distance to the control module.

Based on the determined location or distance of the portable device relative to the vehicle, the PEPS system can then authorize or perform a vehicle function, such as unlocking a door of the vehicle, unlocking a trunk of the vehicle, starting the vehicle, and/or allowing the vehicle to be started. For example, if the portable device is less than a first distance threshold to the vehicle, the PEPS system can activate interior or exterior lights of the vehicle. If the portable devices is less than a second distance threshold to the vehicle, the PEPS system can unlock doors or a trunk of the vehicle. If the portable device is located inside of the vehicle, the PEPS system can allow the vehicle to be started.

Operating the localization system, including operating the control module and all of the sensors, can consume a large amount of power and can quickly drain a battery of the vehicle that includes the localization system. As discussed in further detail below, to conserve power the present disclosure provides systems and methods for selectively instructing components of the localization system, including individual sensors and/or individual processors or modules of the control module, to go into a standby or a sleep state that consumes less power than the full wakeup state. Additionally, the present disclosure provides systems and methods for defining particular wakeup criteria so that the system components of the localization system, including individual sensors and/or individual modules or processors of the control module, can wake up into a fully functioning state at the appropriate time to operate the localization system.

Figure 2:
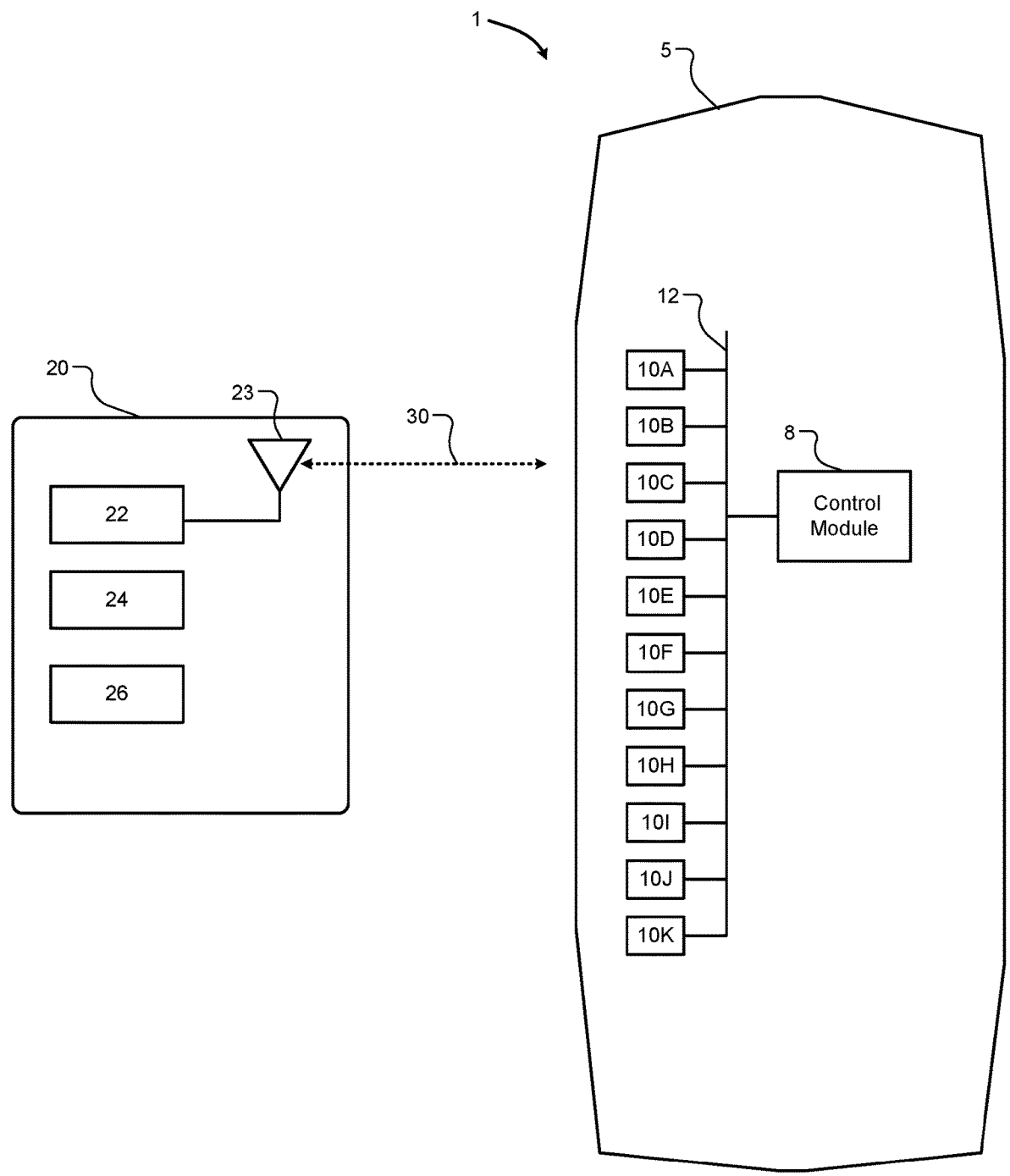
FIG. 2 illustrates a block diagram for a localization system according to the present disclosure.

With reference to FIGS. 1 and 2, a localization system 1 is provided within a vehicle 5 and includes a control module 8 (also referred to as a central communication module) and a plurality of sensors 10A to 10K (collectively or generically referred to as 10). The sensors 10 can include a number of sensors that are mounted on or to the exterior of the vehicle 5, such as an exterior body or trim component of the vehicle 5. In the example of FIG. 1, sensors 10A to 10E are shown as exterior sensors. The sensors 10 can also include a number of sensors that are mounted on or to the interior of the vehicle 5, such as an interior trim component of the vehicle 5. In the example of FIG. 1, sensors 10F to 10K are shown as interior sensors The control module 8 can be implemented, for example, as a PEPS electronic control unit (ECU) and is described in further detail below. The control module 8 can communicate with the plurality of sensors 10 using a wired vehicle interface 12, as shown in FIG. 2. The vehicle interface 12, for example, can include a controller area network (CAN) bus and/or a lower data rate communication bus, such as a local interconnect network (LIN) bus. The vehicle interface 12 can also include a clock extension peripheral interface (CXPI) bus. Additionally or alternatively, the vehicle interface 12 can include a combination of CAN bus, LIN, and CXPI bus communication interfaces. Additionally or alternatively, the control module 8 can communicate with the sensors 10 using wireless communication. The control module 8 is configured to establish a secure communication connection, such as a BLE communication connection, for example, with a portable device 20. As noted above, the control module 8 communicates information about the secure communication connection to the sensors 10 via the vehicle interface 12, such as the timing of the next communication connection event, the timing interval between communication connection events, the communication channel for the next communication connection event, a channel map, a channel hop interval or offset to calculate the channel for subsequent communication connection events, communication latency information, and/or communication jitter information, etc. The sensors 10 can then follow the secure communication connection between the control module 8 and the portable device 20 and eavesdrop on communication packets sent by the portable device 20 to the control module 8. The sensors 10 can then measure signal information about the signals received from the portable device, such as RSSI, angle of arrival, time of arrival, time difference of arrival, etc., and communicate the signal information to the control module 8 via communication over the vehicle interface 12.

With particular reference to FIG. 2, the portable device 20 can include a communication chipset 22, such as a BLE chipset, a Wi-Fi chipset, or a Wi-Fi direct chipset, connected to an antenna 23. The portable device 20 can also include application software stored in a computer-readable storage module or device 24. The portable device 20 can also optionally include a GPS module 26 or other device location service. The portable device 20 sends and receives communication signals 30 to and from the control module 8. As discussed above, the sensors 10 can listen for the communication signals 30 based on the information about the secure communication connection received from the control module 8. As such, the sensors 10 also receive the communication signals 30 sent by the portable device 20 to the control module 8.

Figure 3:
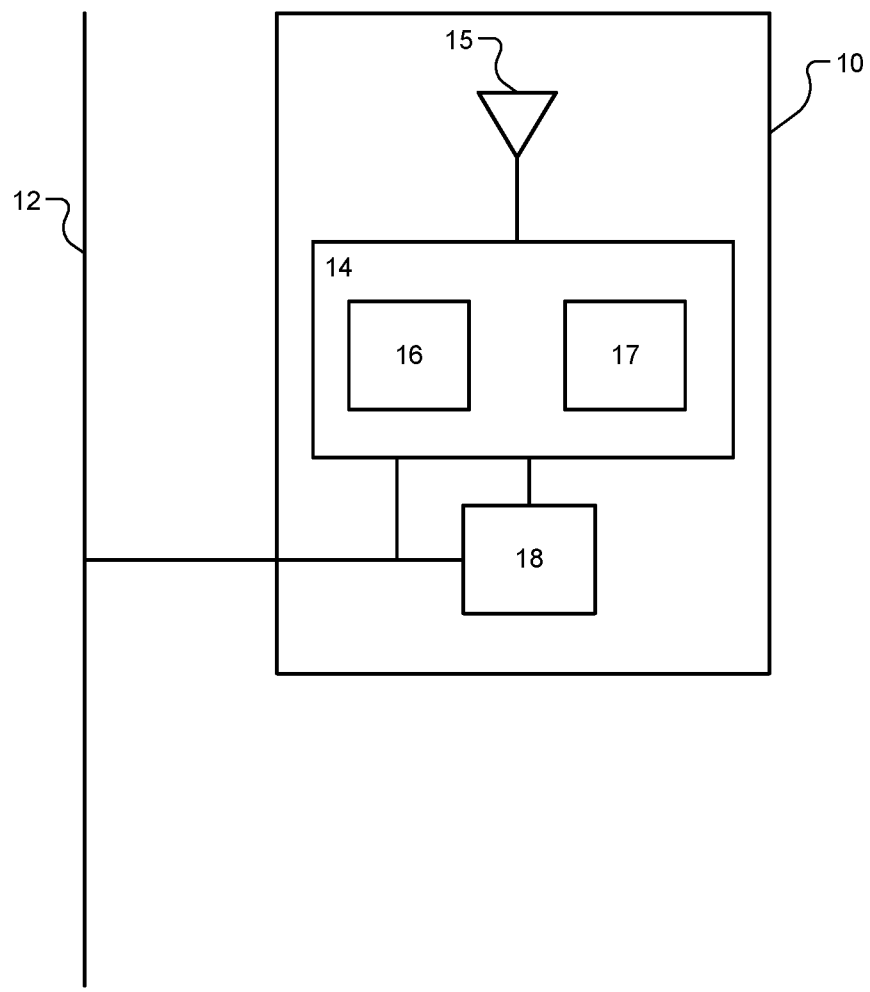
FIG. 3 illustrates a block diagram for a sensor of a localization system according to the present disclosure.

With reference to FIG. 3, each of the sensors 10 includes a communication chipset 14, such as a BLE chipset, a Wi-Fi chipset, or a Wi-Fi direct chipset, connected to an antenna 15. As shown in FIG. 3, the antenna 15 may be located internal to the sensor 10. Alternatively, the antenna 15 may be located external to the sensors 10. The sensors 10 receive communication signals from the portable device 20 using the antenna 15. In the example of FIG. 3, the sensor 10 is configured with a BLE chipset for BLE communication. In the example of FIG. 3, the sensor 10 receives BLE physical layer messages using a BLE physical layer (PHY) controller 16. The sensor 10 is capable of observing BLE physical layer messages and taking measurements of the physical properties of the associated signals, including, for example, the received signal strength (RSSI) using a channel map that is produced by a channel map reconstruction module 17. Additionally or alternatively, the sensor 10 can determine other measurements of the physical properties of the associated signals, including, for example, data related to the angle of arrival. Additionally or alternatively, the various sensors 10 can communicate with each other and/or communicate with the PEPS control module 8 via the vehicle interface 12 to determine time difference of arrival, time of arrival, or angle of arrival data for signals received by the various sensors. A timing synchronization module 18 is configured to accurately measure the reception times of messages on the vehicle interface 12 and pass the timing information to the communication chipset 14. The communication chipset is configured to take the channel map information and the timing signals and tune the PHY controller 16 to a specific channel at a specific time and observe all physical layer messages and data that conform to the physical layer specification for the communication protocol being used. The data, timestamps, measured signal strengths, any other information about the received signals, etc. are reported by the communication chipset 14 to the control module 8 of the vehicle 5 via the vehicle interface 12.

Figure 4:
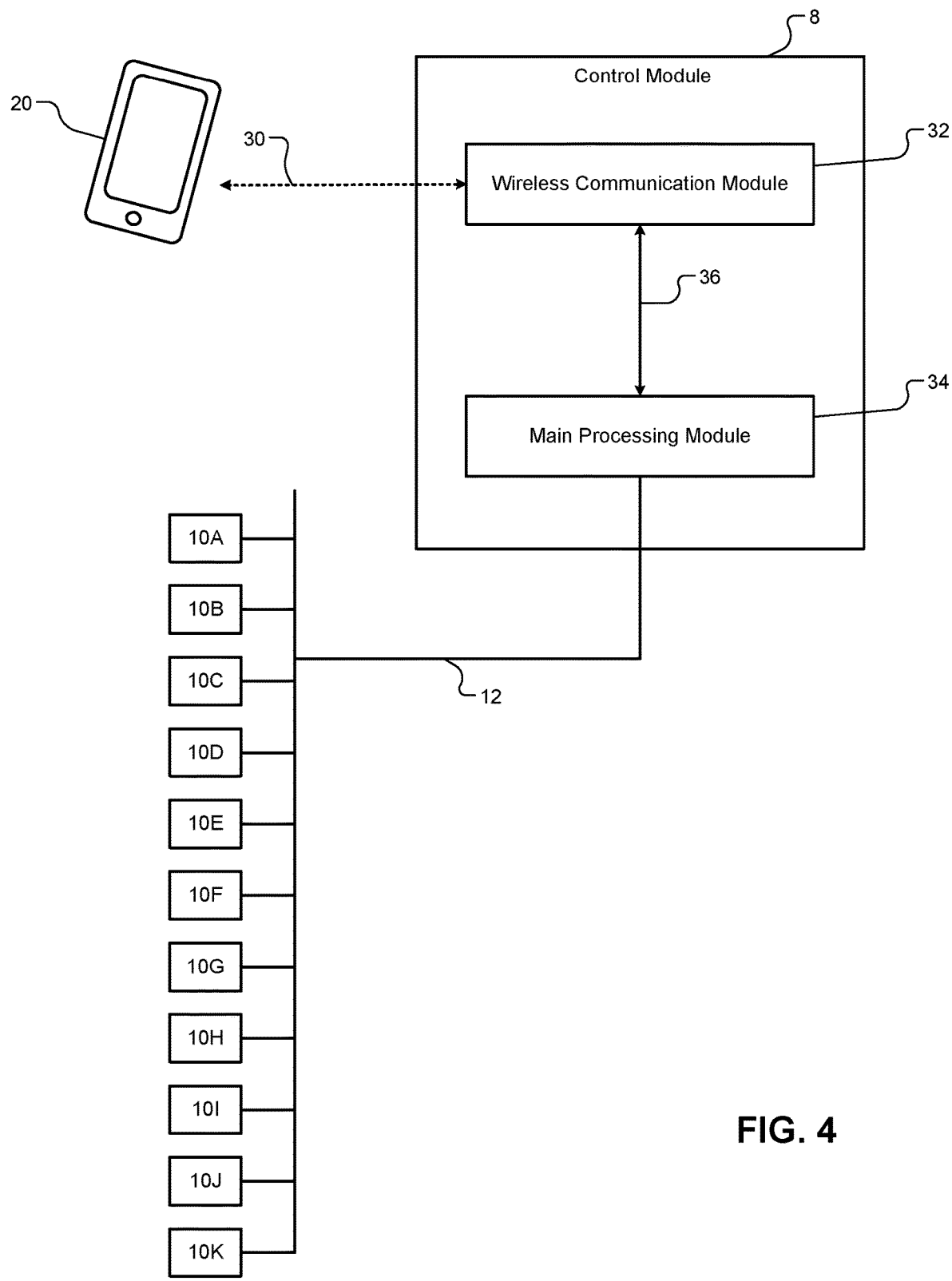
FIG. 4 illustrates a block diagram for a localization system according to the present disclosure.

With reference to FIG. 4, the control module 8 includes a wireless communication module 32 and a main processing module 34. The wireless communication module 32 includes a first processor and wireless communication chipset, such as a BLE chipset, a Wi-Fi chipset, or a Wi-Fi direct chipset, connected to an antenna. The first processor and the wireless communication chipset of the wireless communication module 32 are configured to communicate wirelessly with the portable device 20 using a wireless communication protocol that provides secure communication connections, such as BLE, Wi-Fi, or Wi-Fi direct. The wireless communication module 32 communicates with the main processing module 34 through a wired communication interface 36, such as a serial peripheral interface (SPI) bus, a CAN bus, a LIN bus, a CXPI bus, or other suitable communication interface. The main processing module 34 includes a second processor and is configured to communicate with the wireless communication module 32 over the wired communication interface 36. The main processing module is also configured to communicate with the sensors 10 over the wired vehicle interface 12 to receive, for example, the signal information, such as RSSI, and/or angle of arrival, etc., about the communication signals received by the sensors 10 from the portable device 20. Further, the main processing module 34 and the second processor are configured to perform localization of the portable device 20 by determining a location or distance of the portable device 20 relative to the vehicle 5 based on the received signal information. Additionally or alternatively, the sensors 10 themselves can determine a location or distance of the portable device 20 relative to the vehicle 5 based on the measured signal information and can communicate the location or distance information to the main processing module 34 via communication over the wired vehicle interface 12. The main processing module 34 can also control the PEPS system to unlock doors of the vehicle 5, unlock a trunk of the vehicle 5, and/or allow the vehicle 5 to be started based on the location or distance of the portable device 20 relative to the vehicle 5. Because of the additional processing load on the main processing module 34 and the second processor, the second processor can be a faster and more powerful processor than the first processor. As such, the second processor and the main processing module 34 can require and consume more power than the first processor and the wireless communication module.

Figure 5A:
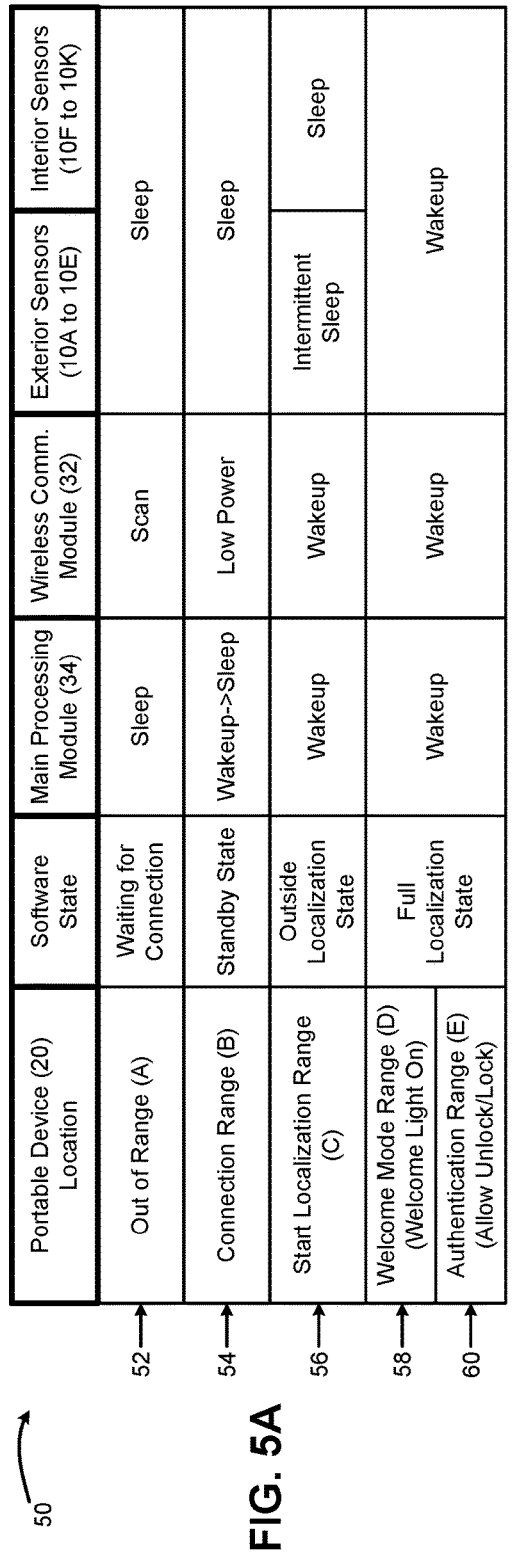
FIG. 5A illustrates a state chart for a localization system according to the present disclosure.

With reference to FIG. 5A, a state chart 50 for a localization system according to the present disclosure is shown. Specifically, the state chart 50 shows the various states of the software of the localization system 1, the main processing module 34, the wireless communication module 32, the exterior sensors 10A to 10E, and the interior sensors 10F to 10K when the portable device 20 is at each of locations A to E (shown in FIG. 5B) relative to the vehicle 5. The portable device locations A to E in FIG. 5 correspond to the locations shown in the leftmost column of the state chart 50, labeled with the heading "Portable Device (20) Location."

Figure 5B:
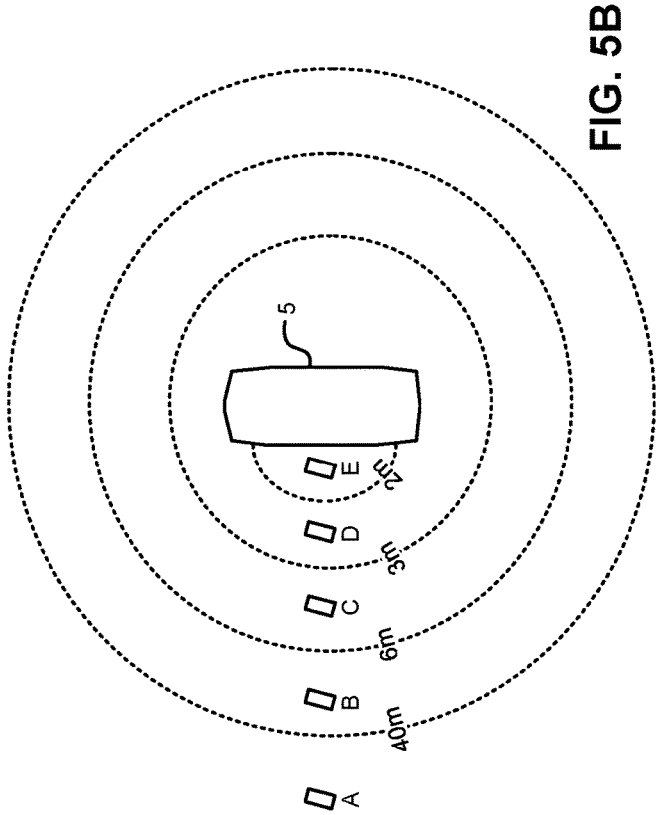
FIG. 5B illustrates a localization system according to the present disclosure and a portable device at various locations referenced in the state chart of FIG. 5A.

With reference to FIGS. 5A and 5B, the state chart 50 includes a first row 52 that corresponds to the portable device 20 being out of communication range from the localization system 1, as shown by location A. The communication range of the localization system 1, for example may be approximately 40 meters or 130 feet. Other communication ranges, however, may be used depending on the specific wireless communication hardware used by the localization system 1. When the portable device 20 is out of communication range from the localization system 1, the software of the localization system 1 is in a "Waiting for Connection" state, as shown in the second column of row 52. When the localization system 1 is waiting for a connection, the main processing module 34 is in a sleep state, the wireless communication module 32 operates in a scanning state, and all of the sensors 10A to 10K are in a sleep state. When the main processing module 34 is in the sleep state, the main processing module and the second processor perform only minimal processing while waiting to receive a wakeup request from the wireless communication module.

For example, the main processing module 34 does not communicate with the portable device 20 or perform processing to determine a location of the portable device 20 while in the sleep state. Similarly, when the sensors 10A to 10K are in the sleep state, the sensors perform only minimal processing while waiting to receive a wakeup command from the main processing module 34. For example, while in the sleep state the sensors 10A to 10K do not scan or listen for wireless communication signals from a portable device 20. When the wireless communication module 32 is in the scanning state, the wireless communication module 32 scans for a portable device 20 in communication range. In other words, the wireless communication module 32 scans to look for wireless communication signals from a portable device 20 within communication range to establish a communication connection with. As shown in row 52 of the state chart 50, while the portable device is out of communication range, both the main processing module 34 and all of the sensors 10A to 10K are in a low-power sleep state.

Once the wireless communication module 32 detects wireless communication signals from a portable device 20 within communication range, the wireless communication module 32 sends a wakeup request to the main processing module 34 and the software of the localization system 1 moves to a "Standby State," as shown in the second row 54 of the state chart 50. In this state, the portable device 20 is at location B, as shown in FIG. 5B, which is within the communication range of the localization system 1. For example, at location B the portable device 20 may be less than approximately 40 meters or 130 feet from the vehicle 5. As noted above, however, other communication ranges may be used depending on the particular wireless communication hardware of the localization system. The main processing module 34 receives the wakeup request from the wireless communication module 32 via communication over the wired communication interface 36. The main processing module 34 then wakes up and attempts to establish a secure communication connection with the detected portable device 20. For example, the main processing module 34 communicates with the portable device 20 through the wireless communication module 32 in an attempt to authenticate whether the portable device 20 has been previously authorized to communicate with the localization system 1. In the event the portable device 20 is not authenticated, the portable device 20 is ignored and the localization system 1 moves back to the "Waiting for Connection" state shown in the first row 52. When the main processing module 34 is able to authenticate the portable device 20, the main processing module 34 establishes a secure communication connection with the portable device 20. Specifically, the main processing module 34 synchronizes communication information with the portable device 20, such as timing information for connection events, channel information for frequency hopping communication, etc.

In the "Standby State," once the main processing module 34 establishes the secure communication connection with the portable device 20, the main processing module 34 then goes back to the sleep state, as shown in the third column of the second row 54 of the state chart 50. At the same time, the wireless communication module 32 goes into a low power state, whereby it performs processing to maintain the secure communication connection with the portable device 20, but does not report information back to the main processing module 34. In other words, in the Standby State, the wireless communication module 32 maintains communication with the portable device using the established secure communication connection, but does not communicate information about the connection or information received from the portable device 20 back to the main processing module 34. In the Standby State, all of the sensors 10A to 10K remain in the low-power sleep state.

While in the Standby State, the wireless communication module 32 measures the RSSI of communication signals received from the portable device 20 and compares the measured RSSI with an RSSI threshold. The RSSI threshold corresponds to an outer perimeter of a localization range. For example, the outer perimeter of a localization range may be approximately 6 meters or 19.6 feet. For example, once the portable device 20 moves within the localization range by moving, for example, from location B to location C, as shown in FIG. 5B, the RSSI of the communication signals received by the wireless communication module 32 from the portable device 20 will be greater than the RSSI threshold. Once the wireless communication module 32 measures an RSSI of the communication signals received from the portable device that is greater than the RSSI threshold, the wireless communication module 32 sends a wakeup request to the main processing module 34 and the localization system 1 moves from the Standby State" to an "Outside Localization State," as shown in the third row 56 of the state chart 50.

In the Outside Localization State, both the main processing module 34 and the wireless communication module 32 are in a full wakeup state, as shown in the third row 56 of the state chart 50. In this state, the wireless communication module 32 is communicating with the portable device 20 using the secure communication connection and is reporting back to the main processing module 34 with information about the communication with the portable device. In the Outside Localization State, the interior sensors 10F to 10K remain in the low-power sleep state. In the Outside Localization State, the main processing module 34 communicates a wakeup command to only the exterior sensors 10A to 10E and provides instructions to the exterior sensors 10A to 10E to remain in an "Intermittent Sleep" state."

As discussed in further detail below, in the Intermittent Sleep state, the main processing module 34 provides information to the exterior sensors 10A to 10E so that the exterior sensors 10A to 10E can follow or eavesdrop on the communications over the secure communication connection between the wireless communication module 32 and the portable device 20. For example, the main processing module 34 can provide timing and synchronization information and channel hopping information so that the sensors 10 know the time and channel of the next connection event and know how to determine the timing and channel information for subsequent connection events. In this way, the sensors 10A to 10E can follow or eavesdrop on communications over the secure communication connection without the portable device 20 being aware that the sensors 10A to 10E are receiving or listening to the communication packets the portable device 20 is sending to the wireless communication module 32 over the secure communication connection.

Further, as discussed in further detail below, in the Intermittent Sleep state, the exterior sensors 10A to 10E can go back to sleep between connection events and can wake up shortly before the next connection event. For example, as discussed in further detail below, the main processing module 34 can provide wakeup criteria used by the sensors to determine when it should move to a full wakeup state and report information about communication signals received from the portable device 20 back to the main processing module 34. For example, the wakeup criteria sent by the main processing module 34 to the exterior sensors 10A to 10E may include a predetermined wakeup RSSI threshold. Once the exterior sensors 10A to 10E measure an RSSI of the communication signals received from the portable device 20 that is greater than the predetermined wakeup RSSI threshold, as set in the wakeup criteria, the sensors 10A to 10E may then go into a full wake up state and report back to the main processing module 34 regarding information about the communication signals received from the portable device 20. In other words, the main processing module 34 can instruct the exterior sensors 10A to 10E to eavesdrop or listen to communication packets received from the portable device 20 over the secure communication connection and to only report back to the main processing module 34 once the detected RSSI of the signals received from the portable device 20 are greater than a predetermined RSSI threshold. In this way, the sensors 10A to 10E are able to go back to sleep and conserve power between connection events of the secure communication connection until the RSSI of signals received from the portable device 20 exceed the RSSI threshold. In addition, the sensors 10A to 10E and the main processing module 34 are able to conserve power by foregoing communication regarding communication packets received by the sensors 10A to 10E until the RSSI of the received communication signals exceeds the RSSI threshold. In other words, the sensors 10A to 10E and the main processing module 34 are able to conserve power by not having to communicate regarding communication received by the sensors 10A to 10E until the RSSI of the received communication signals exceeds the RSSI threshold.

In the above example, the exterior sensors 10A to 10E report back to the main processing module 34 when the RSSI of signals received from the portable device 20 exceeds the RSSI threshold. In addition, the exterior sensors 10A to 10E in the Intermittent Sleep state can also report back to the main processing module 34 if they lose the connection with the portable device 20 and are no longer able to eavesdrop or listen to communication packets sent to the wireless communication module 32 during connection events of the secure communication connection. In such case, the wireless communication module 32 may resend the timing and synchronization information and channel hopping information to any sensors 10 that have lost the connection so that the sensors 10 can resynchronize and look for communication signals during the next and subsequent connection events.

In the above example, in the Outside Localization State shown in the third row 56, the exterior sensors 10A to 10E are in the intermittent sleep state and the interior sensors 10F to 10K are in the sleep state. Any subset of the sensors 10A to 10K, however, can be in the intermittent sleep state, with the remaining sensors outside of the subset being in the sleep state. For example, only a subset of the exterior sensors 10A to 10E could be placed into the Intermittent Sleep State. Alternatively, a subset of the exterior sensors 10A to 10E and a subset of the interior sensors 10F to 10K could be placed into the Intermittent Sleep State.

Additionally, while the above example uses a wakeup criteria that is monitored by the sensors 10 to determine when to report back to the main processing module 34, e.g., the RSSI exceeds the wakeup RSSI threshold, an on-demand reporting mode could alternatively be used. For example, in the on-demand reporting mode, selected sensors 10 could be instructed to enter the Intermittent Sleep to monitor communication signals received from the portable device 20 during the secure connection events between the wireless communication module 32 and the portable device 20, but not to report back to the main processing module 34 until instructed to do so. In other words, in the on-demand reporting mode, the sensors 10 do not report information about the received communication signals from the portable device 20 until the main processing module 34 requests that information from the sensors 10. In this example, the main processing module 34 may wait until a door handle of the vehicle is operated, for example, and may then request all of the sensors 10A to 10K to report the information about the received communication signals from the portable device 20.

With reference again to the example of FIGS. 5A and 5B, once the sensors 10A to 10E determine that communication signals received from the portable device 20 have an RSSI that exceeds the predetermined wakeup RSSI threshold of the wakeup criteria provided by the main processing module 34, the sensors 10A to 10E report information about the received communication signals, such as the RSSI and/or the angle of arrival of the communication signals, to the main processing module 34. The main processing module 34 then performs localization to determine a location or distance of the portable device 20 relative to the vehicle 5. If the location or distance of the portable device 20 is outside of the outer perimeter of a welcome mode range, which, for example, may be approximately 3 meters or 9.8 feet, then the localization system 1 remains in the outside localization state shown in the third row 56 of the state chart. In such case, the main processing module 34 may instruct the sensors 10A to 10E to remain in the intermittent sleep state using the same wakeup criteria or updated wakeup criteria. For example, the main processing module 34 may provide wakeup criteria with an increased wakeup RSSI threshold. Once the main processing module 34 determines that the portable device has moved within the welcome mode range by moving, for example, from location C to location D, as shown in FIG. 5B, then the localization system 1 moves from the outside localization state to the full localization state corresponding to the fourth row 58 and the fifth row 60 of the state chart.

In the full localization state, the main processing module 34, the wireless communication module 32, and all of the sensors 10A to 10K are in the full wakeup state. In the full localization state, the wireless communication module 32 communicates with the portable device 20 using the established secure communication connection. Each of the sensors 10A to 10K listen or eavesdrop on the communication packets sent by the portable device 20 during connection event of the secure communication connection and report back to the main processing module 34 regarding information about the communication signals received from the portable device 20. For example, the sensors 10A to 10K can measure the RSSI of the received communication signals. Additionally or alternatively, the sensors 10A to 10K can determine other measurements of the signals received from the portable device, such as angle of arrival, time of arrival, time difference of arrival, etc. The sensors 10A to 10K report all of the sensed or measured information about the communication signals back to the main processing module 34. The main processing module 34 can then determine a location or distance of the portable device 20 relative to the vehicle 5 based on the received information from the sensors 10A to 10K. Based on the determined location or distance of the portable device 20 relative to the vehicle, Based on the determined location or distance of the portable device 20 relative to the vehicle 5, the main processing module 34 can then authorize or perform a vehicle function, such as unlocking a door of the vehicle 5, unlocking a trunk of the vehicle 5, starting the vehicle 5, and/or allowing the vehicle 5 to be started. If the vehicle 5 is not accessed within a predetermined time, such as, for example 10 minutes, while the localization system 1 is in the Full Localization State, then the localization system 1 can return to the Outside Localization State. While an example of 10 minutes is provided, any other predetermined time period can be used.

For example, when the main processing module 34 determines that the portable device is located with a "Welcome Mode Range," corresponding to the fourth row 58 of the state chart 50, the main processing module 34 may turn on interior and/or exterior lights of the vehicle 5. The Welcome Mode Range, for example, may be approximately 3 meters or 9.8 feet. With reference to FIG. 5B, the portable device 20 at location D is illustrated as within the Welcome Mode Range. When the main processing module 34 determines that the portable device is located with an "Authentication Range," corresponding to the fifth row 60 of the state chart 50, the main processing module 34 may unlock the doors of the vehicle or may allow the doors or the trunk of the vehicle 5 to be unlocked. The Authentication Range, for example, may be approximately 2 meters or 6.5 feet. Additionally, when the main processing module 34 determines that the portable device 20 is located inside of the vehicle 5, the main processing module 34 may allow the vehicle 5 to be started.

In this way, a localization system 1 utilizing the above strategies for communication and the various states shown in the state chart 50 of FIG. 5A is able to significantly conserve power by minimizing communication and setting parameters and strategies for moving certain system components, such as the modules and sensors discussed above, to a low-power state, such as a sleep state, while providing criteria for the components to move to a wakeup state as needed to perform localization. In this way, the use of power and draining of the battery of the vehicle are significantly reduce as compared with systems that do not utilize the above strategies. In other words, utilizing the above strategies for communication and the various states shown in the state chart 50 of FIG. 5A advantageously conserves power and extends battery life of a battery powering the localization system, such as a batter of the vehicle 5.

While the examples above reference specific distances for the various ranges utilized by the localization system 1, any other suitable distances can be used. For example, the above examples utilize a Connection Range with an outer perimeter of 40 meters or 130 feet, a Start Localization Range with an outer perimeter of approximately 6 meters or 19.6 feet, a Welcome Mode Range with an outer perimeter of approximately 3 meters or 9.8 feet, and an Authentication Range with an outer perimeter of approximately 2 meters or 6.5 feet. Any other suitable distances, however, can be used.

Additionally, the various ranges and distances may be adaptively adjusted by the localization system 1 based on the number of false positives tracked and associated with each range. For example, the localization system 1 and, more specifically, the main processing module 34, may track how many times a portable device 20 enters each of the designated ranges, i.e., the Connection Range, the Start Localization Range, the Welcome Mode Range, and the Authentication Range. In addition, the localization system 1 and the main processing module 34 may track how many times the vehicle 5 was actually accessed once the portable device 20 entered the particular range. The main processing module 34 may then determine a rate or percentage of false positives associated with each range. For example, over a predetermined time period, such as a week, a month, a number of months, etc., the main processing module 34 may determine that an authorized portable device 20 entered the Start Localization Range 100 times and that, of those 100 times, the vehicle was accessed 55 times, resulting in 45 false positives, or a false-positive rate of 45 percent. The main processing module 34 may compare the determined false-positive rate to a predetermined false-positive rate threshold and may decrease the associate range and/or other ranges in response to the false-positive rate being greater than the threshold. For example, the main processing module 34 may use a false-positive rate threshold of 30 percent. In this example, because the false-positive rate of 45 percent is greater than the false-positive rate threshold of 30 percent, the main processing module 34 may decrease the outer perimeter of the associated range. For example, in this case main processing module 34 may decrease the outer perimeter of the Start Localization Range from 6 meters or 19.6 feet to 5 meters or 16.4 feet. Similarly, if the false-positive rate is less than a second threshold, then the main processing module 34 may increase the outer perimeter of the associated threshold. In this way, the localization system 1 can adaptively adjust or optimize the various ranges and outer perimeters used by the power saving strategies of the present disclosure.

In addition, the localization system 1 can utilize geo-based ranges that vary depending on the location of the vehicle 5. For example, the localization system 1 may notice a large number of false positives when the vehicle is located at a first location, such as the vehicle owner's home. This may be due to the vehicle owner being near the vehicle, without accessing the vehicle, a large number of times when the vehicle is parked at the vehicle owner's home. In such case, the localization system 1 may decrease the various ranges to decrease the number of false positives when the vehicle is parked at the vehicle owner's house. For example, the localization system 1 may utilize a GPS system of the vehicle 5 to determine the location of the vehicle 5 and may store a particular set of ranges to be used when the vehicle 5 is parked at the particular location, in this case the vehicle owner's house. Additionally, the localization system 1 may notice a small number of false positives when the vehicle 5 is located at a second location, such as the vehicle owner's work place. This may be due to the vehicle owner only being near the vehicle when he is entering or exiting the vehicle at the start of the day, the end of the day, or at a lunch break etc. In this case, the localization system 1 can increase the ranges when the vehicle 5 is parked at the second location, i.e., the vehicle owner's workplace. In this way, the localization system 1 will have a higher level of confidence that the vehicle owner will be accessing the vehicle when the vehicle owner is near the vehicle 5 when it is parked at the vehicle owner's work place.

Figure 7:
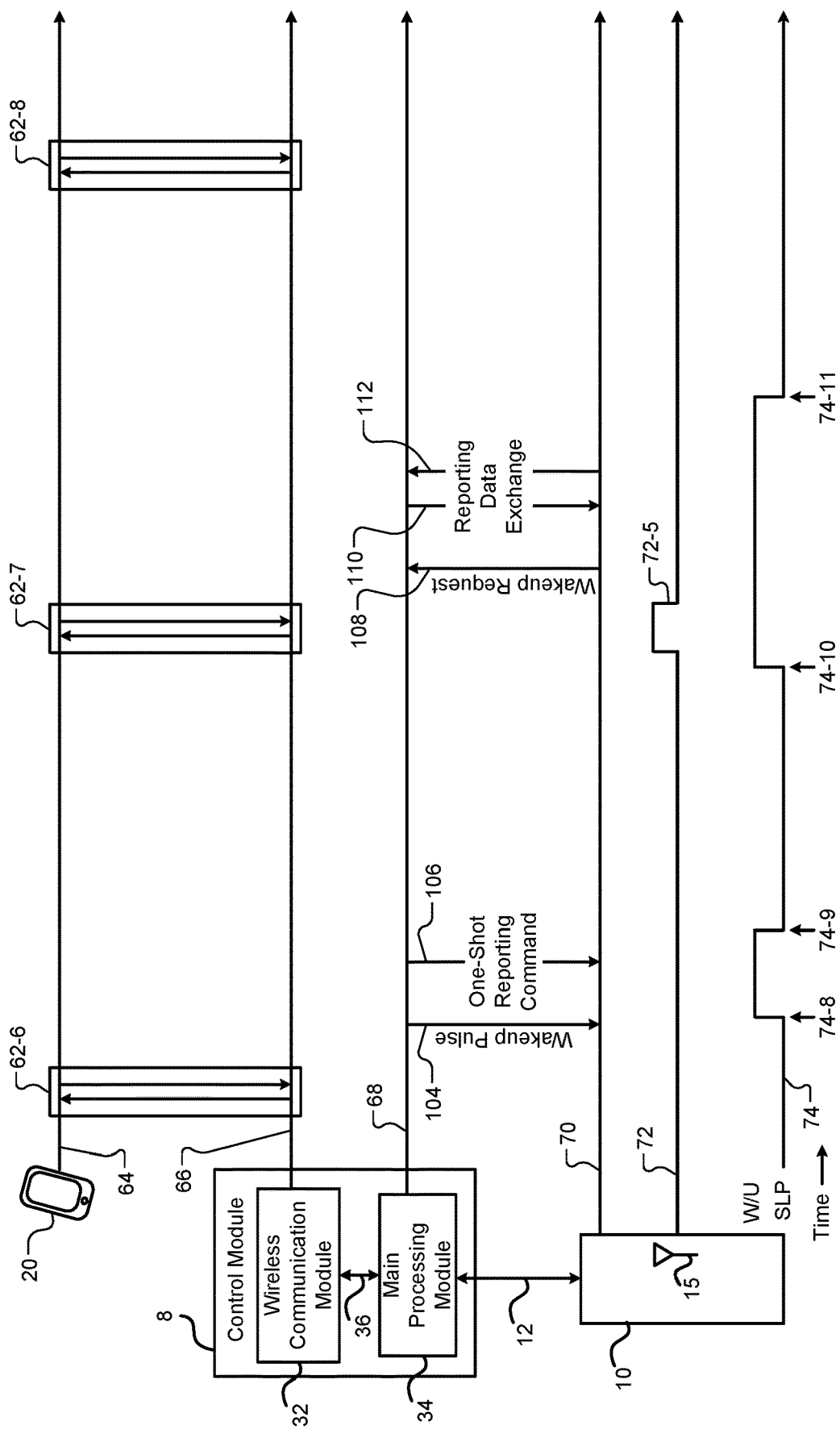
FIG. 7 illustrates another timing diagram for communication of a localization system according to an implementation of the present disclosure.
Figure 8:
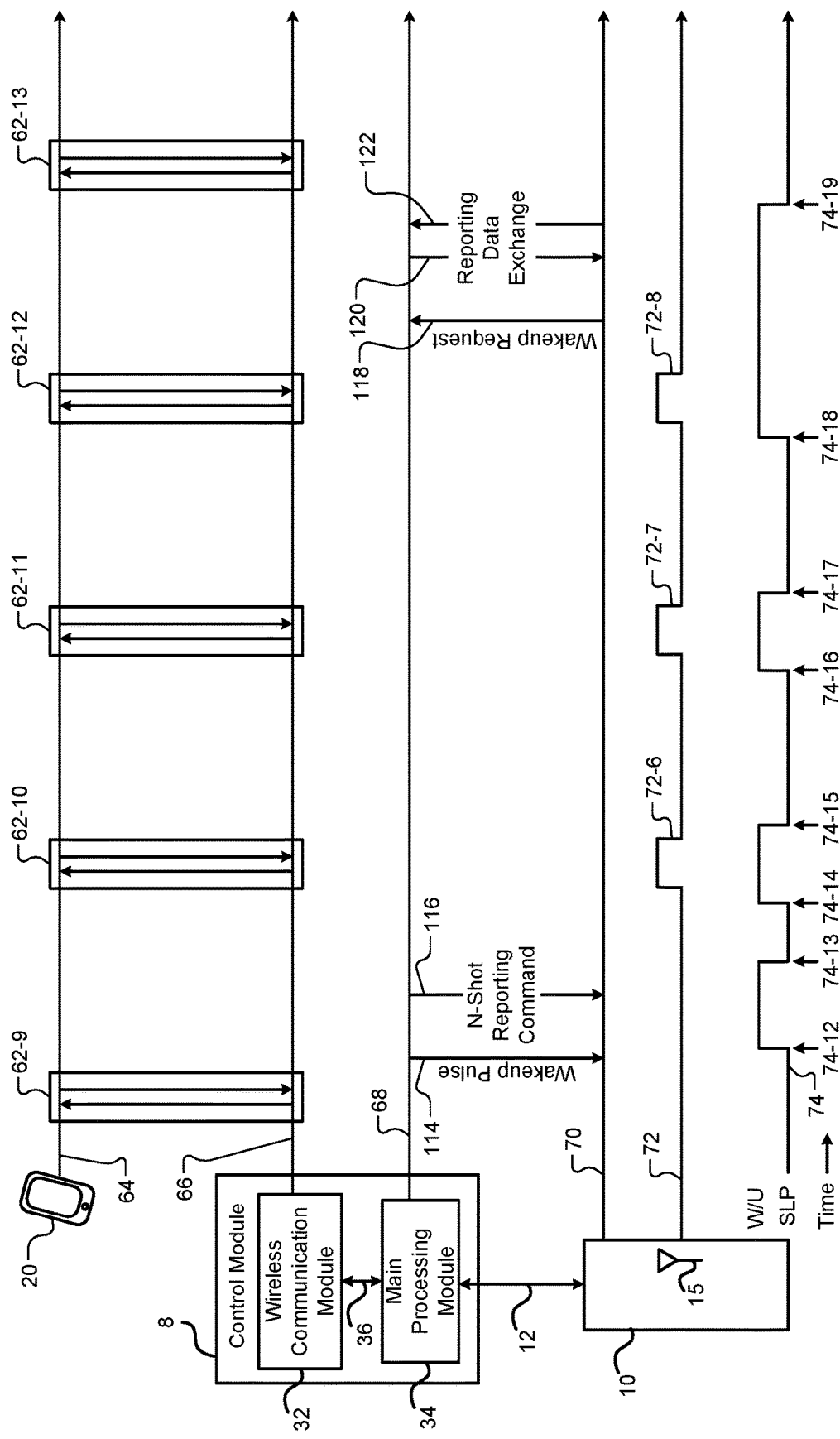
FIG. 8 illustrates another timing diagram for communication of a localization system according to an implementation of the present disclosure.
Figure 9:
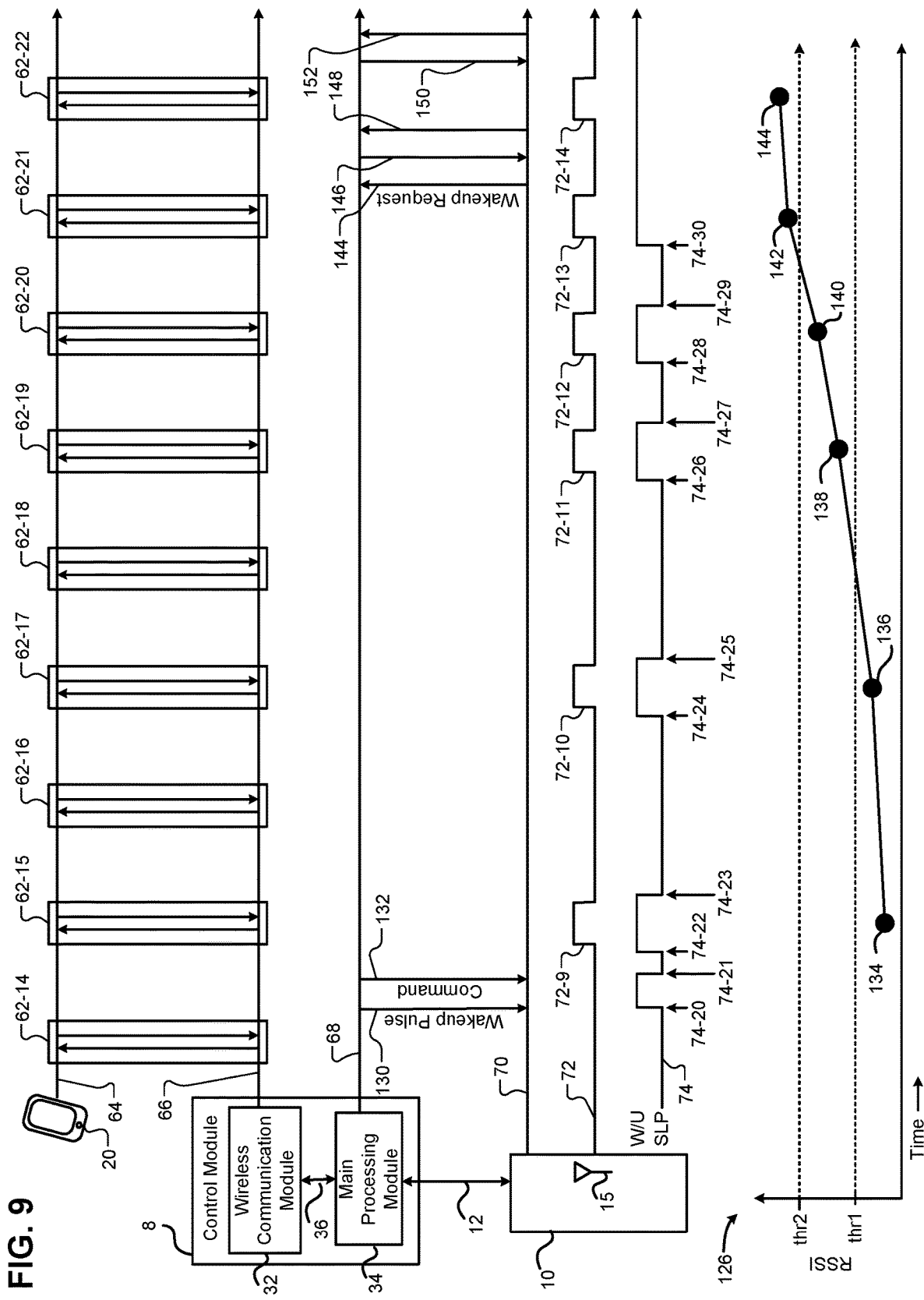
FIG. 9 illustrates another timing diagram for communication of a localization system according to an implementation of the present disclosure.

With reference to FIGS. 6-9, timing diagrams are shown for example implementations of localization systems 1. In FIGS. 6-9, the passage of time is indicated from left to right. In each of the examples of FIGS. 6-9, the wireless communication module 32 of the control module 8 has established a secure communication connection with the portable device 20 and is shown communicating with the portable device during each of the secure communication connection events 62-1 to 62-5 in FIGS. 6, 62-6 to 62-8 in FIGS. 7, 62-9 to 62-13 in FIG. 8, and 62-14 to 62-22 in FIG. 9, which are generically referred to as secure communication connection events 62. In FIGS. 6-9, wireless communication between the wireless communication module 32 of the control module 8 and the portable device 20 is shown by the arrows between timeline 64 and timeline 66. Communication between the main processing module 34 and the sensor 10 over the wired vehicle interface 12 is shown by the arrows between timeline 68 and timeline 70. Timeline 72 shows when the sensor 10 is listening for communication signals sent by the portable device 20 during the secure communication connection events 62. In particular, the raised intervals 72-1 to 72-4 in FIG. 6, 72-5 in FIGS. 6, 72-6 to 72-8 in FIG. 8, and 72-9 to 72-14 in FIG. 9 illustrate the specific times when the sensor 10 is listening for wireless communication signals sent by the portable device 20 during the secure communication connection events 62. Timeline 74 shows the state of the sensor 10 in either the wakeup state (W/U) or the sleep state (SLP). In particular, a rising edge of a raised interval in FIGS. 6-9 indicates that the sensor is entering the wakeup state (W/U) and a falling edge of a raised interval indicates that the sensor is entering the sleep state (SLP). In particular, rising edges 74-1, 74-3, 74-5, and 74-7 in FIG. 6, rising edges 74-8 and 74-10 in FIG. 7, rising edges 74-12, 74-14, 74-16, and 74-18 in FIG. 8, and rising edges 74-20, 74-22, 74-24, 74-26, 74-28, and 74-30 in FIG. 9 indicate times when the sensor 10 is entering the wakeup state (W/U). Similarly, falling edges 74-2, 74-4, and 74-6 in FIG. 6, falling edges 74-9, and 74-11 in FIG. 7, falling edges 74-13, 74-15, 74-17, 74-19 in FIG. 8, and 74-21, 74-23, 74-25, 74-27, and 74-29 in FIG. 9 indicate times when the sensor 10 is entering the sleep state (SLP).

Figure 6:
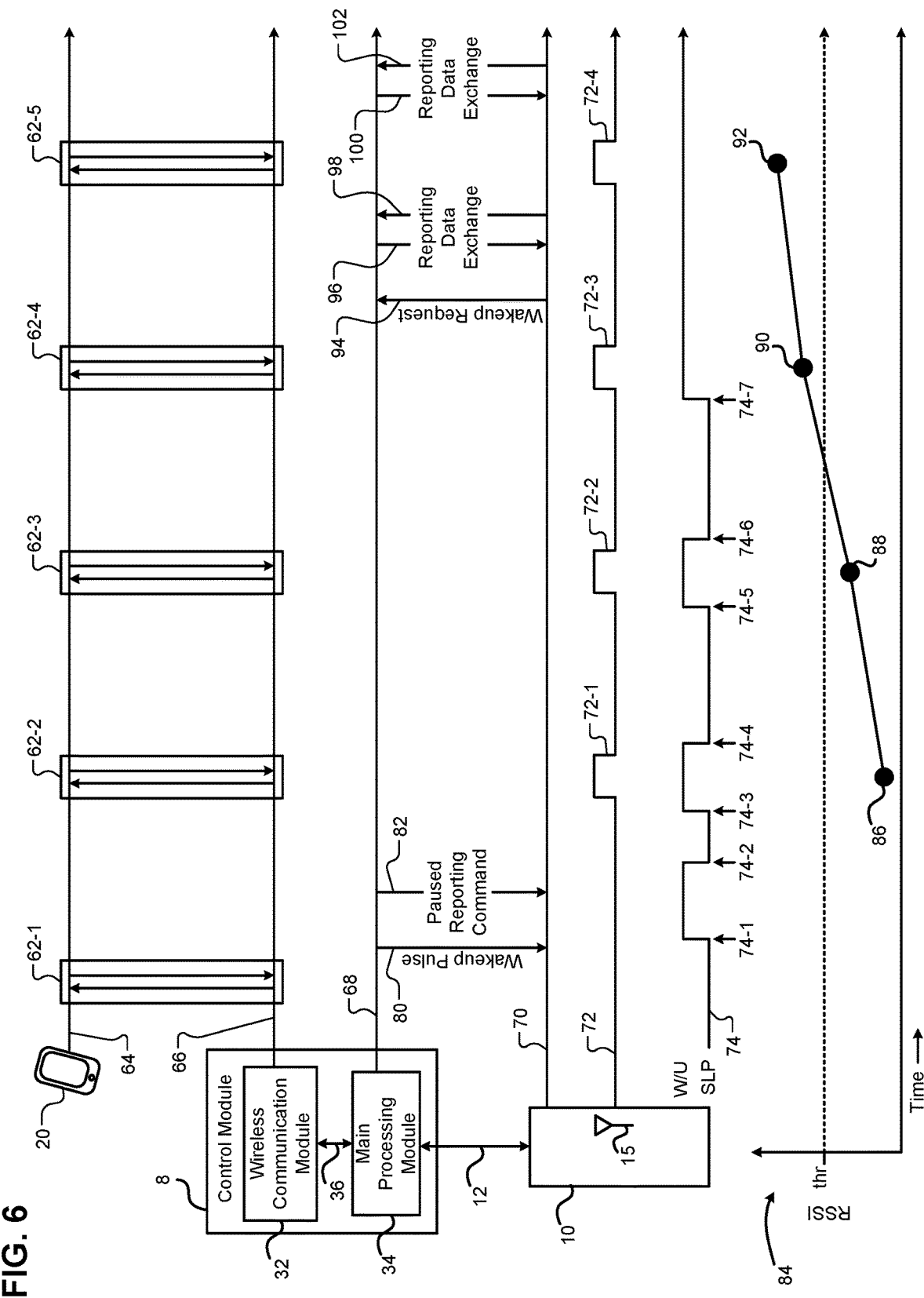
FIG. 6 illustrates a timing diagram for communication of a localization system according to an implementation of the present disclosure.

With reference to FIG. 6, and as noted above, the control module 8 has established a secure communication connection with the portable device. In FIG. 6, the sensor 10 is initially in the sleep state. The main processing module 34 sends a wakeup pulse 80 to the sensor 10 over the wired vehicle interface 12. In response to the wakeup pulse 80, the sensor 10 wakes up at 74-1. The main processing module 34 then sends a paused reporting command 82 to the sensor 10. The paused reporting command 82 initiates the Intermittent Sleep state, discussed above with respect to FIG. 5A, and includes the particular wakeup criteria to be used by the sensor 10 in determining when to report signal information regarding communication signals received from the portable device 20 back to the main processing module 34. For example, the wakeup criteria may indicate that the sensor 10 should not report back to the main processing module 34 until the RSSI of a communication signal received from the portable device 20 is greater than an RSSI threshold, shown as "thr" in the RSSI graph 84, shown in FIG. 6. The paused reporting command 82 can also include information about the secure communication connection with the portable device 20, such as the timing of the next communication connection event (in this case connection event 62-2), the timing interval between communication connection events, the communication channel for the next communication connection event, a channel map, a channel hop interval or offset, communication latency information, communication jitter information, etc. In this way, the sensor 10 is aware of the timing and channel for the next communication connection event, in this case connection event 62-2 and goes back to the sleep state at 74-2 to conserve power.

At 74-3, slightly before the next communication connection event 62-2, the sensor 10 wakes itself up and begins listening for wireless communication signals sent by the portable device 20 during communication connection event 62-2, as shown by raised interval 72-1. The sensor 10 wakes itself up slightly before the next communication connection event 62-2 is scheduled to occur so that it can perform the necessary steps to activate and command the sensor hardware, such as a receiver of the sensor 10, to listen for communication signals at the appropriate timing and frequency channel.

Once the sensor 10 receives the communication signals transmitted by the portable device 20, the sensor determines whether the instructed wakeup criteria has been met. In this case, the sensor 10 determines whether an RSSI of the received communication signals is greater than the RSSI threshold "thr." As shown in the RSSI graph 84, the RSSI of the signals received during connection event 62-2 are shown at 86 and is below the RSSI threshold "thr" shown by the dotted line across the RSSI graph 84. Because the measured RSSI of the received communication signals is below the RSSI threshold "thr," the wakeup criteria has not been met. As such, the sensor 10 puts itself back into the sleep state at 74-4 and waits for the next connection event 62-3. Similar to connection event 62-2, the sensor 10 wakes itself up again at 74-5 and listens for communication signals from the portable device 20 during connection event 62-3, as shown by raised interval 72-2. As shown at 88, the RSSI of the signals received during connection event 62-3 is still below the RSSI threshold "thr." As such, the sensor puts itself back into the sleep mode again at 74-6 and waits for the next connection event 62-4.

Similar to connection events 62-2 and 62-3, the sensor 10 wakes itself up again at 74-7 and listens for communication signals from the portable device 20 during connection event 62-4, as shown by raised interval 72-3. As shown at 90, the RSSI of the signals received during connection event 62-4 is now greater than the RSSI threshold "thr." As such, the sensor 10 determines that the wakeup criteria has now been met and takes steps to report information about the received communication signals back to the main processing module 34.

The sensor 10 sends a wakeup request 94 over the wired vehicle interface 12 to alert the main processing module 34 that it has information to report regarding communication signals received from the portable device 20. At 96 and 98, a reporting data exchange is performed. Specifically, at 96 the main processing module 34 requests the sensor 10 to send information regarding the communication signals received from the portable device 20 and at 98 the sensor 10 sends the information regarding the communication signals to the main processing module 34. The information regarding the communication signals received from the portable device can include, for example, the RSSI of the signals, the angle of arrival, time of arrival, time difference of arrival, etc., The sensor 10 then listens to the next connection event 62-5 and performs another reporting data exchange at 100 and 102. Specifically, at 100 the main processing module 34 requests the sensor 10 to send information regarding the communication signals received from the portable device 20 and at 102 the sensor 10 sends the information regarding the communication signals to the main processing module 34.

As discussed above, based on the information received from the sensors 10, the control module 8 can determine the location or distance of the portable device 20 relative to the vehicle 5. Based on the determined location or distance of the portable device 20 relative to the vehicle, the localization system 1 can then authorize or perform a vehicle function, such as unlocking a door of the vehicle 5, unlocking a trunk of the vehicle 5, starting the vehicle, and/or allowing the vehicle to be started.

While FIG. 6 shows the control module 8 communicating with a single sensor 10, it is understood that the processing and communication described above with reference to FIG. 6 can be performed in parallel/simultaneously with each of the sensors 10A to 10K or with a subset of the sensors 10A to 10K.

Further, in the example of FIG. 6 the sensor 10 compares the RSSI of the communication signals received from the portable device 20. Alternatively, the sensor 10 itself can be configured to determine the distance of the portable device 20 relative to the vehicle 5 and can compare the determined distance with a distance threshold provided by the main processing module 34 in the paused reporting command 82. In such an implementation, the sensor 10 can wake up an initiate reporting back to the main processing module 34 once the distance to the portable device is less than the distance threshold.

With reference to FIG. 7, a timing diagram for another example implementation of a localization system 1 is shown. The example implementation of FIG. 7 is similar to the example implementation of FIG. 6 except that in the example implementation of FIG. 7 the main processing module 34 instructs the sensor to listen to signals from the portable device 20 during a single connection event, in this case 62-7, and then report back on the information about the communication signals received during the single connection event.

In FIG. 7, and as noted above, the control module 8 has established a secure communication connection with the portable device. In FIG. 7, the sensor 10 is initially in the sleep state. The main processing module 34 sends a wakeup pulse 104 to the sensor 10 over the wired vehicle interface 12. In response to the wakeup pulse 104, the sensor 10 wakes up at 74-8. The main processing module 34 then sends a one-shot reporting command 106 to the sensor 10. The one-shot reporting command 106 instructs the sensor to listen or eavesdrop on communication signals from the portable device 20 during the next connection event, in this case 62-7, and report back to the main processing module 34 with signal information regarding communication signals received from the portable device 20. The one-shot reporting command 106 can also include information about the secure communication connection with the portable device 20, such as the timing of the next communication connection event (in this case connection event 62-7), the communication channel for the next communication connection event, communication latency information, communication jitter information, etc. In this way, the sensor 10 is aware of the timing for the next communication connection event, in this case connection event 62-7, and goes back to the sleep state at 74-9 to conserve power.

At 74-10, slightly before the next communication connection event 62-7, the sensor 10 wakes itself up and begins listening for wireless communication signals sent by the portable device 20 during communication connection event 62-7, as shown by raised interval 72-5. The sensor 10 wakes itself up slightly before the next communication connection event 62-7 is scheduled to occur so that it can perform the necessary steps to activate and command the sensor hardware, such as a receiver of the sensor 10, to listen for communication signals at the appropriate timing and frequency channel. Having received the communication signals from the portable device 20 during the connection event 62-7, as instructed, the sensor 10 takes steps to report information about the received communication signals back to the main processing module 34.

The sensor 10 sends a wakeup request 108 over the wired vehicle interface 12 to alert the main processing module 34 that it has information to report regarding communication signals received from the portable device 20. At 110 and 112, a reporting data exchange is performed. Specifically, at 110 the main processing module 34 requests the sensor 10 to send information regarding the communication signals received from the portable device 20 and at 112 the sensor 10 sends the information regarding the communication signals to the main processing module 34. The information regarding the communication signals received from the portable device 20 can include, for example, the RSSI of the signals, the angle of arrival, time of arrival, time difference of arrival, etc., The sensor 10 then puts itself back into the sleep state at 74-11 and waits for its next instruction from the main processing module 34.

As discussed above, based on the information received from the sensors 10, the control module 8 can determine the location or distance of the portable device 20 relative to the vehicle 5. Based on the determined location or distance of the portable device 20 relative to the vehicle, the localization system 1 can then authorize or perform a vehicle function, such as unlocking a door of the vehicle 5, unlocking a trunk of the vehicle 5, starting the vehicle, and/or allowing the vehicle to be started.

While FIG. 7 shows the control module 8 communicating with a single sensor 10, it is understood that the processing and communication described above with reference to FIG. 7 can be performed in parallel/simultaneously with each of the sensors 10A to 10K or with a subset of the sensors 10A to 10K.

With reference to FIG. 8, a timing diagram for another example implementation of a localization system 1 is shown. The example implementation of FIG. 8 is similar to the example implementation of FIG. 7 except that in the example implementation of FIG. 8 the main processing module 34 instructs the sensor 10 to listen to signals from the portable device 20 during multiple connection events, in this case three connection events 62-10, 62-11, and 62-12, and then report back on the information about the communication signals received during the multiple connection events. While FIG. 8 shows an example of the sensor 10 listening or eavesdropping on three connection events, any number of connection events can be used. For example, the sensor 10 can be instructed to listen or eavesdrop on ten connection events before reporting back to the main processing module 34.

In FIG. 8, and as noted above, the control module 8 has established a secure communication connection with the portable device 20. In FIG. 8, the sensor 10 is initially in the sleep state. The main processing module 34 sends a wakeup pulse 114 to the sensor 10 over the wired vehicle interface 12. In response to the wakeup pulse 104, the sensor 10 wakes up at 74-12. The main processing module 34 then sends an N-shot reporting command 116 to the sensor 10. The N-shot reporting command 116 instructs the sensor 10 to listen or eavesdrop on communication signals from the portable device 20 during the next N connection events. In the example of FIG. 8, the main processing module 34 instructs the sensor 10 to listen to the next three connection events, in this case 62-10, 62-11, and 62-12, and then report back to the main processing module 34 with signal information regarding communication signals received from the portable device 20. As noted above, although the example of FIG. 8 shows an N-shot reporting command 116 for three connection events (i.e., N=3), N can be any positive integer to instruct the sensor 10 to listen or eavesdrop on any number of connection events The N-shot reporting command 116 can also include information about the secure communication connection with the portable device 20, such as timing, synchronization, channel hopping information, etc., about the secure communication connection. For example, the N-shot reporting command 116 can include information such as the timing of the next communication connection event, the timing interval between communication connection events, the communication channel for the next communication connection event, a channel map, a channel hop interval or offset so that the channel for subsequent communication connection events can be calculated, communication latency information, communication jitter information, etc.

In this way, the sensor 10 is aware of the timing for the next N communication connection events, in this case connection events 62-10, 62-11, and 6212, and goes back to the sleep state at 74-13 to conserve power.

At 74-14, slightly before the next communication connection event 62-10, the sensor 10 wakes itself up and begins listening for wireless communication signals sent by the portable device 20 during communication connection event 62-10, as shown by raised interval 72-6. The sensor 10 wakes itself up slightly before the next communication connection event 62-10 is scheduled to occur so that it can perform the necessary steps to activate and command the sensor hardware, such as a receiver of the sensor 10, to listen for communication signals at the appropriate timing and frequency channel. Once the sensor 10 receives the communication signals transmitted by the portable device 20 during connection event 62-10, the sensor 10 puts itself back into the sleep state at 74-15 and waits for the next connection event 62-11. Similar to connection event 62-10, the sensor 10 wakes itself up again at 74-16 and listens for communication signals from the portable device 20 during connection event 62-11, as shown by raised interval 72-7. The sensor 10 then puts itself back into the sleep mode again at 74-17 and waits for the next connection event 62-12. Similar to connection event 62-10 and 62-11, the sensor 10 wakes itself up again at 74-18 and listens for communication signals from the portable device 20 during connection event 62-12, as shown by raised interval 72-8.

In accordance with the instructions provided to the sensor via the N-shot reporting command 116, having listened or eavesdropped on communication signals from the portable device 20 during three connection events, the sensor 10 now takes steps to report information about the received communication signals back to the main processing module 34. The sensor 10 sends a wakeup request 118 over the wired vehicle interface 12 to alert the main processing module 34 that it has information to report regarding communication signals received from the portable device 20. At 120 and 122, a reporting data exchange is performed. Specifically, at 120 the main processing module 34 requests the sensor 10 to send information regarding the communication signals received from the portable device 20 during the multiple connection events and at 122 the sensor 10 sends the information regarding the communication signals to the main processing module 34. The information regarding the communication signals received from the portable device 20 can include, for example, the RSSI of the signals, the angle of arrival, time of arrival, time difference of arrival, etc., The sensor 10 then puts itself back into the sleep state at 74-19 and waits for its next instruction from the main processing module 34.

As discussed above, based on the information received from the sensors 10, the control module 8 can determine the location or distance of the portable device 20 relative to the vehicle 5. Based on the determined location or distance of the portable device 20 relative to the vehicle, the localization system 1 can then authorize or perform a vehicle function, such as unlocking a door of the vehicle 5, unlocking a trunk of the vehicle 5, starting the vehicle, and/or allowing the vehicle to be started.

While FIG. 8 shows the control module 8 communicating with a single sensor 10, it is understood that the processing and communication described above with reference to FIG. 8 can be performed in parallel/simultaneously with each of the sensors 10A to 10K or with a subset of the sensors 10A to 10K.

With reference to FIG. 9, a timing diagram for another example implementation of a localization system 1 is shown. The example implementation of FIG. 9 is similar to the example implementation of FIG. 6 except that in the example implementation of FIG. 9 the sensor 10 is commanded to adjust a sample rate for listening to the connection events 62 based on the RSSI of the communication signals received from the portable device 20 during a connection event 62. As discussed in further detail below, in the example implementation of FIG. 9, the sensor 10 is instructed to listen to every other connection 62 until the RSSI of the received communication signals is greater than a first RSSI threshold, shown as thr1 in the RSSI graph 126 of FIG. 9. In other words, the sensor 10 is instructed to alternately skip a connection event 62 and listen to a connection event 62 until the RSSI of the received communication signals is greater than the first RSSI threshold (thr1). In this way, the sensor 10 is commanded to utilize a sample rate of fifty percent by listening to only half of the connection events 62 until the RSSI of the received communication signals is greater than the first RSSI threshold (thr1). As discussed in further detail below, other sample rates can be used. For example, instead of skipping one connection event 62, the sensor 10 can be instructed to skip two connection events 62 before listening to a connection event 62. In this way, the sensor 10 can utilize a sample rate of thirty-three percent. Any other number of connection events 62 can be skipped to adjust the sample rate. For example, the sensor 10 can be instructed to skip one, two, three, four, five, six, or any other number of connection events 62 between waking up to listen to a connection event. In addition, as discussed in further detail below, multiple RSSI thresholds can be used in conjunction with multiple sample rates. For example, the sensor 10 can initially use a first sample rate, such as thirty-three percent, until the RSSI of the received communication signals is greater than a first threshold. Once the RSSI is greater than the first threshold, the sensor 10 can use a second sample rate, such as fifty percent. Once the RSSI is greater than a second threshold, the sensor 10 can use a third sample rate of one-hundred percent. In each case, once RSSI of the communication signals is greater than a reporting threshold, shown as thr2 in the RSSI graph 126 of FIG. 9, the sensor 10 then reports information about the communication signals back to the main processing module 34.

With continued reference to FIG. 9, and as noted above, the control module 8 has established a secure communication connection with the portable device. In FIG. 9, the sensor 10 is initially in the sleep state. The main processing module 34 sends a wakeup pulse 130 to the sensor 10 over the wired vehicle interface 12. In response to the wakeup pulse 130, the sensor 10 wakes up at 74-20. The main processing module 34 then sends a reporting command 132 to the sensor 10. The reporting command 132 initiates the Intermittent Sleep state, discussed above with respect to FIG. 5A, and includes the particular wakeup and sample rate criteria to be used by the sensor 10 in determining when listen for communication signals and when to report signal information regarding communication signals received from the portable device 20 back to the main processing module 34. For example, the sample rate criteria in the example of FIG. 9 instructs the sensor 10 to use a sample rate of fifty percent by skipping every other connection event 62. The sample rate criteria also includes a first RSSI threshold (thr1) for sensor 10 to determine when to increase the sample rate from fifty percent to one-hundred percent. In addition, the wakeup criteria may indicate that the sensor 10 should not report back to the main processing module 34 until the RSSI of a communication signal received from the portable device 20 is greater than a wakeup RSSI threshold, shown as "thr2" in the RSSI graph 126, shown in FIG. 9. The reporting command 132 can also include information about the secure communication connection with the portable device 20, such as the timing of the next communication connection event (in this case connection event 62-15), the timing interval between communication connection events, the communication channel for the next communication connection event, a channel map, a channel hop interval or offset, communication latency information, communication jitter information, etc. In this way, the sensor 10 is aware of the timing and channel for the next and subsequent communication connection events and is able to determine when to wakeup to listen to a connection event 62, as dictated by the sample rate and wakeup criteria. In the example of FIG. 9, the next connection event after the command 132 is connection event 62-15. As such, the sensor 10 goes back to sleep at 74-21 to conserve power while waiting for the next connection event 62-15.

At 74-22, slightly before the next communication connection event 62-15, the sensor 10 wakes itself up and begins listening for wireless communication signals sent by the portable device 20 during communication connection event 62-15, as shown by raised interval 72-9. The sensor 10 wakes itself up slightly before the next communication connection event 62-15 is scheduled to occur so that it can perform the necessary steps to activate and command the sensor hardware, such as a receiver of the sensor 10, to listen for communication signals at the appropriate timing and frequency channel.

Once the sensor 10 receives the communication signals transmitted by the portable device 20, the sensor 10 compares an RSSI of the communication signals with the RSSI thresholds (thr1 and thr2) provided in the command 132 to determine whether the sample rate should be adjusted or if the wakeup criteria has been met. As shown in the RSSI graph 126, the RSSI of the signals received during connection event 62-15 are shown at 134 and is below the RSSI threshold "thr1" shown by the lower dotted line across the RSSI graph 126. Because the measured RSSI of the received communication signals is below the RSSI threshold "thr1," the neither wakeup criteria nor the criteria for increasing the sample rate has been met. As such, the sensor 10 puts itself back into the sleep state at 74-23. Because the sensor 10 in this case is utilizing a sample rate of fifty percent, the sensor 10 skips the next connection event 62-16. In other words, the sensor 10 remains asleep during connection event 62-16 (as indicated by the portion of line 72 between 72-9 and 72-10) and waits for the next connection event thereafter, which is now connection event 62-17. Similar to connection event 62-15, the sensor 10 wakes itself up again at 74-24 and listens for communication signals from the portable device 20 during connection event 62-17, as shown by raised interval 72-10. As shown at 136, the RSSI of the signals received during connection event 62-17 is still below the RSSI threshold "thr1." As such, the sensor 10 puts itself back into the sleep mode again at 74-25, skips the next connection event 62-18, as dictated by the fifty percent sample rate, and waits for the next subsequent connection event 62-19.

Similar to connection events 62-15 and 62-17, the sensor 10 wakes itself up again at 74-26 and listens for communication signals from the portable device 20 during connection event 62-19, as shown by raised interval 72-11. As shown at 138, the RSSI of the signals received during connection event 62-19 is now greater than the RSSI threshold "thr1," but still less than the RSSI threshold "thr2." As such, the sensor 10 determines that the criteria for increasing the sample rate has been met, but that the wakeup criteria still has not been met. The sensor 10 goes back to sleep at 74-27, but this time instead of skipping the next connection event 62-20, the sensor 10 wakes itself up at 74-28 to listen to the next connection event 62-20, as shown by raised interval 72-12. As shown at 140, the RSSI of the signals received during connection event 62-20 is still less than the RSSI threshold "thr2," but still greater than the RSSI threshold "thr1." As such, the sensor 10 continues with the sample rate of one-hundred percent and puts itself to sleep at 74-29 to wait for the next connection event 62-21.

The sensor 10 wakes itself up at 74-30 to listen to the next connection event 62-21, as shown by raised interval 72-13. As shown at 142, the RSSI of the signals received is now greater than the RSSI threshold "thr2." As such, the wakeup criteria has now been met and the sensor 10 takes steps to report information about the received communication signals back to the main processing module 34.

For example, the sensor 10 sends a wakeup request 144 over the wired vehicle interface 12 to alert the main processing module 34 that it has information to report regarding communication signals received from the portable device 20. At 146 and 148, a reporting data exchange is performed. Specifically, at 146 the main processing module 34 requests the sensor 10 to send information regarding the communication signals received from the portable device 20 and at 148 the sensor 10 sends the information regarding the communication signals to the main processing module 34. The information regarding the communication signals received from the portable device 20 can include, for example, the RSSI of the signals, the angle of arrival, time of arrival, time difference of arrival, etc., The sensor 10 then listens to the next connection event 62-22 and performs another reporting data exchange at 150 and 152. Specifically, at 150 the main processing module 34 requests the sensor 10 to send information regarding the communication signals received from the portable device 20 and at 152 the sensor 10 sends the information regarding the communication signals to the main processing module 34.

As discussed above, based on the information received from the sensors 10, the control module 8 can determine the location or distance of the portable device 20 relative to the vehicle 5. Based on the determined location or distance of the portable device 20 relative to the vehicle, the localization system 1 can then authorize or perform a vehicle function, such as unlocking a door of the vehicle 5, unlocking a trunk of the vehicle 5, starting the vehicle, and/or allowing the vehicle to be started.

While FIG. 9 shows the control module 8 communicating with a single sensor 10, it is understood that the processing and communication described above with reference to FIG. 9 can be performed in parallel/simultaneously with each of the sensors 10A to 10K or with a subset of the sensors 10A to 10K.

Further, in the example of FIG. 9 the sensor 10 compares the RSSI of the communication signals received from the portable device 20. Alternatively, the sensor 10 itself can be configured to determine the distance of the portable device 20 relative to the vehicle 5 and can compare the determined distance with a distance threshold provided by the main processing module 34 in the command 132. In such an implementation, the sensor 10 can adjust the sample rate or wake up to initiate reporting back to the main processing module 34 once the distance to the portable device 20 is less than applicable distance thresholds, instead of RSSI thresholds.

As noted above, different sample rates and different RSSI thresholds can be used. For example, an initial sample rate can be used by the sensor 10 and as the RSSI of the communication signals increases, the sample rate can be increased as well. For example, as the RSSI of the communication signals exceeds one or more RSSI thresholds, the sample rate can be increased accordingly.

Additionally or alternatively, signal information other than RSSI can also be used to determine the sample rate. For example, the sample rate can be adjusted by the sensor 10 based on the angle of arrival (AoA), the time of arrival, the time different of arrival, the time of flight, or other applicable signal information of the received communication signals. Additionally or alternatively, the sample rate can be adjusted by the sensor 10 based on signal quality or signal stability. For example, communication signals that exhibit high signal stability can require less sampling. As such, the sample rate can be decreased as the signal stability of the received communication signals increases.

Additionally or alternatively, the sample rate can be adjusted by the sensor 10 based on movement detected by an accelerometer or other data from the portable device 20. For example, if the portable device 20 is not moving and is remaining stationary, due to being set down on a stationary surface, it is less likely that the vehicle 5 will be immediately accessed. As such, the sample rate can be decreased until the accelerometer data from the portable device 20 indicates that the portable device is moving again. Additionally or alternatively, the system can utilize machine learning to determine the likelihood that the vehicle will be accessed and the sample rate can be adjusted based on the determined likelihood. For example, if it is less likely that the vehicle will be accessed, the sample rate can be appropriately decreased and if it is more likely that the vehicle will be accessed, the sample rate can be appropriately increased. For example, the system may determine that during night time, the user never accesses the vehicle. As such, the system can decrease the sample rate to save power during the determined night time hours.

In this way, the example implementations of the present disclosure provide power saving methods for communication in localization systems. Specifically, the example systems and methods discussed herein advantageously conserve power by placing system components, such as processors, modules, and/or sensors, into a sleep state and by waking those system components up at specific times to advantageously collect information about signals sent by a portable device 20 and to determine a location of or distance to the portable device 20. In this way, the example implementations of the present disclosure save power and avoid vehicle battery drain, as compared with localization systems that do not utilize these methods and strategies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit." The term "memory hardware" may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML); (ii) assembly code; (iii) object code generated from source code by a compiler; (iv) source code for execution by an interpreter; (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
a control module configured to establish a secure wireless communication connection with a portable device; and
at least one sensor configured to receive connection information about the secure wireless communication connection, to eavesdrop on the wireless secure communication connection based on the connection information, to measure signal information of at least one communication signal sent from the portable device to the control module during the secure wireless communication connection, to compare the measured signal information with wakeup criteria information, to report the measured signal information to the control module in response to the measured signal information satisfying the wakeup criteria, and to not report the measured signal information to the control module in response to the measured signal information not satisfying the wakeup criteria;
wherein the control module is further configured to receive the measured signal information from the at least one sensor reported to the control module in response to the measured signal information satisfying the wakeup criteria and to determine a location of the portable device based on the measured signal information, the measured signal information including at least one of received signal strength indicator information, angle of arrival information, and time difference of arrival information for the at least one communication signal sent from the portable device to the control module.

2. The system of claim 1, wherein the at least one sensor and the control module are installed in a vehicle and the control module is further configured to perform a vehicle function including at least one of unlocking a door of the vehicle, unlocking a trunk of the vehicle, and allowing the vehicle to be started based on the location of the portable device.

3. The system of claim 1, wherein the secure wireless communication connection is a Bluetooth low energy (BLE) communication connection.

4. The system of claim 1, wherein the secure wireless communication connection includes communication during a plurality of communication connection events separated in time and wherein the at least one sensor is configured to go into a sleep state between consecutive communication connection events of the plurality of communication connection events.

5. The system of claim 1, wherein the at least one sensor is configured to measure the signal information of the at least one communication signal by measuring a received signal strength and to determine a received signal strength indicator (RSSI) of the at least one communication signal, wherein the wakeup criteria information includes an RSSI threshold, and wherein the at least one sensor is further configured to determine that the measured signal information satisfies the wakeup criteria information when the RSSI of the at least one communication signal is greater than the RSSI threshold.

6. The system of claim 1, wherein the control module includes a wireless communication module and a main processing module, the wireless communication module is configured to establish the wireless secure communication connection with the portable device, the main processing module is configured to determine the location of the portable device based on the measured signal information, the main processing module is configured to go into a sleep state in response to the portable device leaving a wireless communication range of the wireless communication module, the main processing module includes a first processor, the wireless communication module includes a second processor, and the first processor is faster than the second processor.

7. The system of claim 1, wherein the at least one sensor is further configured to receive the wakeup criteria from the control module.

8. The system of claim 1, wherein the at least one sensor includes at least one interior sensor and at least one exterior sensor, and wherein the control module is configured to instruct the at least one interior sensor to operate in a sleep state in response to the control module determining that the location of the portable device is greater than a predetermined distance from a vehicle that includes the control module based on measured signal information received from the at least one exterior sensor and to instruct the at least one interior sensor to wake up in response to the control module determining that the location of the portable device is less than the predetermined distance from the vehicle.

9. A method comprising:
establishing, with a control module, a secure wireless communication connection with a portable device;
sending, with the control module, connection information about the secure wireless communication connection;
eavesdropping, with the at least one sensor, on the wireless secure communication connection based on the connection information;
measuring, with the at least one sensor, signal information of at least one communication signal sent from the portable device to the control module during the secure wireless communication connection;
comparing, with the at least one sensor, the measured signal information with wakeup criteria information;
reporting, with the at least one sensor, the measured signal information to the control module in response to the measured signal information satisfying the wakeup criteria and not reporting the measured signal information to the control module in response to the measured signal information not satisfying the wakeup criteria;
receiving, with the control module, the measured signal information from the at least one sensor reported to the control module in response to the measured signal information satisfying the wakeup criteria; and
determining, with the control module, a location of the portable device based on the measured signal information, the measured signal information including at least one of received signal strength indicator information, angle of arrival information, and time difference of arrival information for the at least one communication signal sent from the portable device to the control module.

10. The method of claim 9, wherein the at least one sensor and the control module are installed in a vehicle, the method further comprising performing, with the control module, a vehicle function including at least one of unlocking a door of the vehicle, unlocking a trunk of the vehicle, and allowing the vehicle to be started based on the location of the portable device.

11. The method of claim 9, wherein the secure wireless communication connection is a Bluetooth low energy (BLE) communication connection.

12. The method of claim 9, wherein the secure wireless communication connection includes communication during a plurality of communication connection events separated in time and wherein the method further comprises going into a sleep state, with the at least one sensor, between consecutive communication connection events of the plurality of communication connection events.

13. The method of claim 9, wherein measuring, with the at least one sensor, the signal information of the at least one communication signal includes measuring a received signal strength and determining a received signal strength indicator (RSSI) of the at least one communication signal, wherein the wakeup criteria information includes an RSSI threshold, and wherein comparing, with the at least one sensor, the measured signal information with the wakeup criteria information includes comparing the RSSI of the at least one communication signal with the RSSI threshold, and wherein the at least one sensor determines that the measured signal information satisfies the wakeup criteria information when the RSSI of the at least one communication signal is greater than the RSSI threshold.

14. The method of claim 9, wherein the control module includes a wireless communication module and a main processing module, the main processing module includes a first processor, the wireless communication module includes a second processor, and the first processor is faster than the second processor, the wireless communication module being configured to perform establishing the secure wireless communication connection with the portable device, the main processing module is configured to perform determining the location of the portable device based on the measured signal information, the method further comprising going into a sleep mode, with the main processing module, in response to the portable device leaving a wireless communication range of the wireless communication module.

15. The method of claim 9, the method further comprising sending, with the control module, the wakeup criteria information to the at least one sensor.

16. The method of claim 9, wherein the at least one sensor includes at least one interior sensor and at least one exterior sensor, the method further comprising instructing, with the control module, the at least one interior sensor to operate in a sleep state in response to the control module determining that the location of the portable device is greater than a predetermined distance from a vehicle that includes the control module based on measured signal information received from the at least one exterior sensor and instructing, with the control module, the at least one interior sensor to wake up in response to the control module determining that the location of the portable device is less than the predetermined distance from the vehicle.

17. A system comprising:
a control module configured to establish a secure wireless communication connection with a portable device, the secure wireless communication connection including communication during a plurality of communication connection events separated in time; and
at least one sensor configured to receive connection information about the secure wireless communication connection, to receive a reporting command indicating a number of communication connection events, to eavesdrop on at least one communication connection event according to the number of communication connection events indicated by the reporting command based on the connection information, to measure signal information of at least one communication signal sent from the portable device to the control module during the at least one communication connection event, and to report the measured signal information to the control module after eavesdropping on the at least one communication connection event;
wherein the control module is further configured to receive the measured signal information from the at least one sensor and to determine a location of the portable device based on the measured signal information, the measured signal information including at least one of received signal strength indicator information, angle of arrival information, and time difference of arrival information for the at least one communication signal sent from the portable device to the control module.

18. The system of claim 17, wherein the at least one sensor and the control module are installed in a vehicle and the control module is further configured to perform a vehicle function including at least one of unlocking a door of the vehicle, unlocking a trunk of the vehicle, and allowing the vehicle to be started based on the location of the portable device.

19. The system of claim 17, wherein the number of communication connection events is one.

20. The system of claim 17, wherein the number of communication connection events is more than one and the at least one sensor is further configured to go into a sleep state between consecutive communication connection events.

* * * * *